United States Patent
Doorbar et al.

(10) Patent No.: US 10,458,274 B2
(45) Date of Patent: Oct. 29, 2019

(54) GEARED GAS TURBINE ENGINE AND A GEARBOX

(71) Applicant: ROLLS-ROYCE plc, London (GB)

(72) Inventors: Phillip J Doorbar, Derby (GB); Jason J Madge, Dursley (GB)

(73) Assignee: ROLLS-ROYCE plc, London (GB)

( * ) Notice: Subject to any disclaimer, the term of this patent is extended or adjusted under 35 U.S.C. 154(b) by 272 days.

(21) Appl. No.: 15/625,523

(22) Filed: Jun. 16, 2017

(65) Prior Publication Data

US 2018/0016938 A1    Jan. 18, 2018

(30) Foreign Application Priority Data

Jul. 12, 2016   (GB) .................................. 1612081.8

(51) Int. Cl.
    *F01D 25/00*    (2006.01)
    *F01D 15/12*    (2006.01)
    (Continued)

(52) U.S. Cl.
    CPC ............. *F01D 25/005* (2013.01); *F01D 5/06* (2013.01); *F01D 15/08* (2013.01); *F01D 15/12* (2013.01);
    (Continued)

(58) Field of Classification Search
    CPC .......... F01D 25/005; F01D 5/06; F01D 25/16; F01D 15/08; F01D 15/12;
    (Continued)

(56) References Cited

U.S. PATENT DOCUMENTS 4,674,351 A * 6/1987 Byrd ........................ F16D 3/76
                                                       464/90
2003/0232694 A1   12/2003 Buhrke
(Continued)

FOREIGN PATENT DOCUMENTS

| DE | 102011075915 A1 | 12/2012 | |
| DE | 102011083604 A1 * | 3/2013 | .............. B23P 15/00 |
| JP | 2007-268575 A | 10/2007 | |

OTHER PUBLICATIONS

Nov. 8, 2017 Search Report issued in European Patent Application No. 17 17 6448.

(Continued)

*Primary Examiner* — J. Todd Newton
(74) *Attorney, Agent, or Firm* — Oliff PLC

(57) ABSTRACT

A gas turbine engine comprises a gearbox comprises a sun gear, an annulus gear, a plurality of planet gears and a carrier. The sun gear meshes with the planet gears and the planet gears mesh with the annulus gear. The planet gear carrier comprising a first ring, a second ring spaced axially from the first ring and a plurality of circumferentially spaced axles extending axially between the first ring and the second ring. Each planet gear is rotatably mounted on a respective one of the axles and the axles are arranged at a first radius. At least one of the first ring and the second ring comprises a metal matrix composite material ring and the metal matrix composite ring comprises a ring of reinforcing fibres and the ring of reinforcing fibres having a second radius greater than the first radius.

20 Claims, 4 Drawing Sheets

(51) Int. Cl.
*F01D 5/06* (2006.01)
*F01D 15/08* (2006.01)
*F01D 25/16* (2006.01)
*F16H 1/28* (2006.01)
*F16H 57/08* (2006.01)
*F02C 7/36* (2006.01)

(52) U.S. Cl.
CPC ............... *F01D 25/16* (2013.01); *F02C 7/36* (2013.01); *F16H 1/28* (2013.01); *F16H 57/08* (2013.01); *F16H 57/082* (2013.01); *F05D 2220/32* (2013.01); *F05D 2260/40311* (2013.01); *F05D 2300/171* (2013.01); *F05D 2300/174* (2013.01); *F05D 2300/2261* (2013.01); *F05D 2300/2282* (2013.01); *F05D 2300/2283* (2013.01); *F05D 2300/6032* (2013.01); *Y02T 50/672* (2013.01)

(58) Field of Classification Search
CPC ..... F05D 2300/2261; F05D 2300/2283; F05D 2300/2282; F05D 2260/40311; F05D 2300/174; F05D 2300/6032; F05D 2220/32; F05D 2300/171; F05D 2260/53; F05D 2300/603; F05D 2300/6033; F05D 2300/611; F05D 2300/702; F02C 7/32; F02C 7/36; B64D 35/00; F16H 1/02; F16H 57/082; F16H 1/28; F16H 57/08; Y02E 10/722

USPC ...... 415/122.1; 475/331, 344, 345, 901, 902
See application file for complete search history.

(56) References Cited

U.S. PATENT DOCUMENTS

| | | | |
|---|---|---|---|
| 2010/0331139 A1* | 12/2010 | McCune | F02C 7/06 475/331 |
| 2016/0146112 A1* | 5/2016 | Van der Merwe | F16H 57/08 475/331 |
| 2016/0252176 A1* | 9/2016 | van der Merwe | F16H 57/025 475/348 |
| 2016/0363056 A1* | 12/2016 | Webster | F02C 7/36 |
| 2018/0010525 A1* | 1/2018 | Madge | F02C 7/32 |
| 2018/0016938 A1* | 1/2018 | Doorbar | F01D 5/06 |
| 2018/0297119 A1* | 10/2018 | Clarke | F02C 7/36 |
| 2019/0048983 A1* | 2/2019 | Modrzejewski | F16H 55/06 |
| 2019/0120368 A1* | 4/2019 | Dickman | F16H 57/0424 |

OTHER PUBLICATIONS

Jan. 4, 2017 Search Report issued in British Patent Application No. 1612081.8.

* cited by examiner

GEARED GAS TURBINE ENGINE AND A GEARBOX

The present disclosure concerns a geared gas turbine engine and in particular to a geared turbofan gas turbine engine or a geared turbo propeller gas turbine engine.

A geared turbofan gas turbine engine or a geared turbo propeller gas turbine engine comprises a gearbox which is arranged to drive the fan or propeller. The gearbox allows the fan, or the propeller, to rotate at a speed less than the speed the speed of rotation of a turbine driving the gearbox. This enables the efficiency of the fan, or the propeller, and the efficiency of the turbine to be improved.

In one arrangement the gearbox comprises a sun gear which is arranged to be driven by a turbine, an annulus gear which is arranged to be static, planet gears meshing with the sun gear and the annulus gear and a carrier which is arranged to drive the fan, or the propeller, if the gearbox is a planetary gearbox. In another arrangement the gearbox comprises a sun gear which is arranged to be driven by a turbine, an annulus gear which is arranged to drive the fan, or the propeller, planet gears meshing with the sun gear and the annulus gear and a carrier which is arranged to be static if the gearbox is a star gearbox. In a further arrangement the gearbox comprises a sun gear which is arranged to be driven by a turbine, an annulus gear which is arranged to drive a first fan, or a first propeller, planet gears meshing with the sun gear and the annulus gear and a carrier which is arranged to drive a second fan, or a second propeller, if the gearbox is a differential gearbox.

In large, high speed, gearboxes the gearbox must endure very high loads due to centrifugal loading from the rotating planet gears and the basic torque load which the gearbox is arranged to transmit. The carrier of the gearbox is required to support the loads applied to the planet gears and planet gear bearings, which may be generated by torque or centrifugally generated. The carrier must also maintain the positions of the gears very accurately to maintain adequate gear performance in terms of controlling the tooth loading and the noise, or vibration, levels.

The carrier comprises one or more disc like structures, or ring structures, which are arranged to transmit both the torsional load and the radial load and control deflections of the carrier within the limits required for the gearbox. Torsional loads may produce torsional displacements of the gears which may result in improved load sharing between the gears. However, radial loads may produce radial displacements of the planet gears relative to the sun and annulus gears which may result in transmission errors and hence noise and vibration and tooth overloading.

In order to overcome this problem it is known to make the gears with larger gear teeth so that the gears are less sensitive to the radial displacements, but this has the disadvantage of increasing the inefficiency of the gearbox and increasing the tendency for scuffing. It is also known to make the carrier stiffer/stronger by increasing the mass of the carrier, but this mass has to be added at a large diameter region of the carrier which in turn generates further centrifugal loads and has the disadvantage of increasing the weight of the carrier, and/or increasing the diameter of the rim of the carrier, and hence increasing the weight of the geared gas turbine engine.

The present disclosure seeks to provide a geared gas turbine engine which reduces or overcomes this problem.

According to a first aspect of the present disclosure there is provided a gas turbine engine comprising a gearbox, the gearbox comprising a sun gear, an annulus gear, a plurality of planet gears and a carrier, the sun gear meshing with the planet gears and the planet gears meshing with the annulus gear, the carrier comprising a first ring, a second ring spaced axially from the first ring and a plurality of circumferentially spaced axles extending axially between the first ring and the second ring, each planet gear being rotatably mounted on a respective one of the axles, the axles being arranged at a first radius, at least one of the first ring and the second ring comprising a metal matrix composite material, the metal matrix composite material comprising a ring of reinforcing fibres and the ring of reinforcing fibres having a second radius greater than the first radius.

According to a second aspect of the disclosure there is provided a gearbox, the gearbox comprising a sun gear, an annulus gear, a plurality of planet gears and a carrier, the sun gear meshing with the planet gears and the planet gears meshing with the annulus gear, the carrier comprising a first ring, a second ring spaced axially from the first ring and a plurality of circumferentially spaced axles extending axially between the first ring and the second ring, each planet gear being rotatably mounted on a respective one of the axles, the axles being arranged at a first radius, at least one of the first ring and the second ring comprising a metal matrix composite material, the metal matrix composite material comprising a ring of reinforcing fibres and the ring of reinforcing fibres having a second radius greater than the first radius.

According to a third aspect of the present disclosure there is provided a planet gear carrier comprising a first ring, a second ring spaced axially from the first ring, a plurality of circumferentially spaced axles extending axially between the first ring and the second ring and a plurality of planet gears, each planet gear being rotatably mounted on a respective one of the axles, the axles being arranged at a first radius, at least one of the first ring and the second ring comprising a metal matrix composite material, the metal matrix composite material comprising a ring of reinforcing fibres and the ring of reinforcing fibres having a second radius greater than the first radius.

The first ring may comprise a first metal matrix composite material and the second ring may comprise a second metal matrix composite material, the first metal matrix composite material comprising a first ring of reinforcing fibres, the first ring of reinforcing fibres having a second radius greater than the first radius, the second metal matrix composite material comprising a second ring of reinforcing fibres and the second ring of reinforcing fibres having a second radius greater than the first radius.

The first ring and the second ring may be secured together. The first ring and the second ring may be fastened, bolted, together.

Each of the axles may comprise a third metal matrix composite material, the third metal matrix composite material comprising reinforcing fibres extending axially between the first ring and the second ring. Each axle may be hollow.

The first metal matrix composite material may comprise a steel matrix, a titanium matrix or a titanium alloy matrix. The first metal matrix composite material may comprise silicon carbide fibres, silicon nitride fibres or boron nitride fibres. The second metal matrix composite material may comprise a steel matrix, a titanium matrix or a titanium alloy matrix. The second metal matrix composite material may comprise silicon carbide fibres, silicon nitride fibres or boron nitride fibres. The third metal matrix composite material may comprise a steel matrix, a titanium matrix or a titanium alloy matrix. The third metal matrix composite material may comprise silicon carbide fibres, silicon nitride fibres or boron nitride fibres.

Each planet gear may be rotatably mounted on the carrier by a journal bearing and/or at least one rolling element bearing.

Each planet gear may be rotatably mounted on the carrier by two rolling element bearings.

The carrier may be connected to an output shaft and the annulus gear is connected to a static structure.

The carrier may be connected to a static structure and the annulus gear is connected to an output shaft.

The carrier may be connected to an output shaft and the annulus gear is connected to an output shaft.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine engine may comprising a propulsor, an intermediate-pressure compressor, a high-pressure compressor, a high-pressure turbine and a low pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine engine may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine engine may comprise a propulsor, a nigh-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to drive the intermediate-pressure compressor and the low-pressure turbine is arranged to drive the first propulsor and the second propulsor via a gearbox.

The sun gear may be driven by the low-pressure turbine, the annulus gear may be secured to static structure and the carrier may be arranged to drive the propulsor.

The sun gear may be driven by the low-pressure turbine, the carrier may be secured to static structure and the annulus gear may be arranged to drive the propulsor.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

The propulsor may be a fan or a propeller.

The sun gear, the planet gears and the annulus gear may each comprise two sets of helical gear teeth.

Alternatively, the sun gear, the planet gears and the annulus gear may each comprise one set of helical gear teeth.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which.

Figure 1:
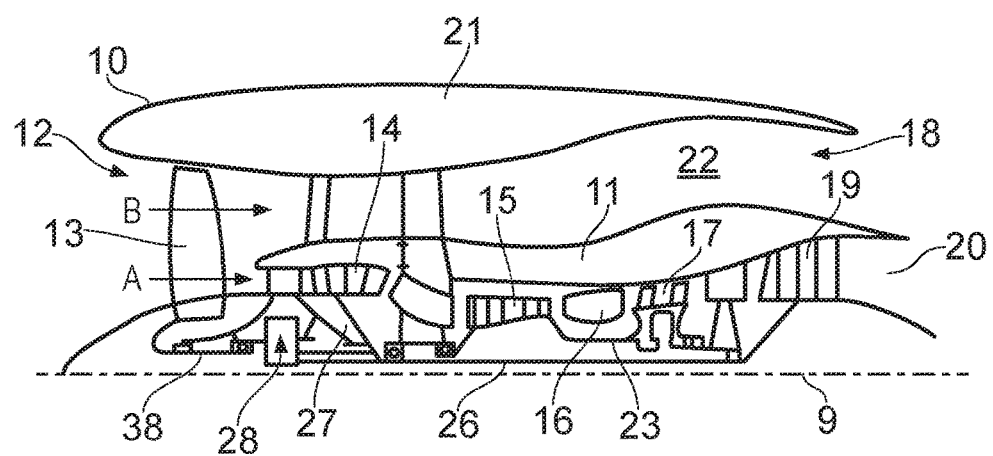
FIG. 1 is a part sectional side view of a geared turbofan gas turbine engine according to the present disclosure.
Figure 2:
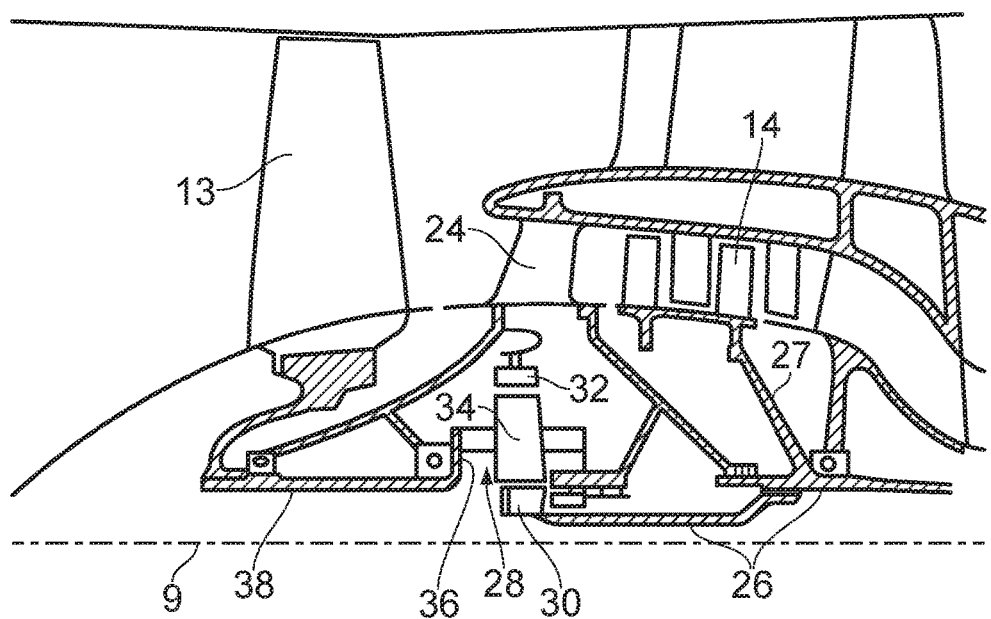
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is compressed by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 is a planetary gearbox and comprises a sun gear 30, an annulus gear 32, a plurality of planet gears 34 and a planet gear carrier 36. The sun gear 30 meshes with the planet gears 34 and the planet gears 34 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9. The shaft 38 is rotatably mounted in static structure by one or more bearings, e.g. rolling element bearings, e.g. roller bearings or ball bearings.

Figure 3:
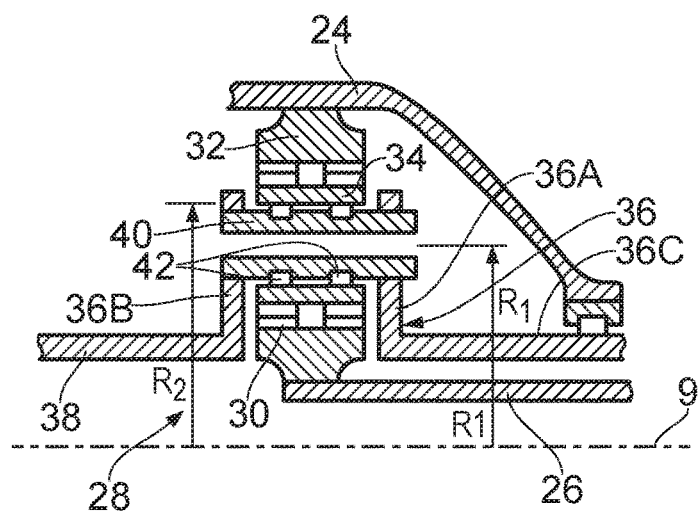
FIG. 3 is an enlarged cross-sectional view though the gearbox shown in FIG. 2.
Figure 4:
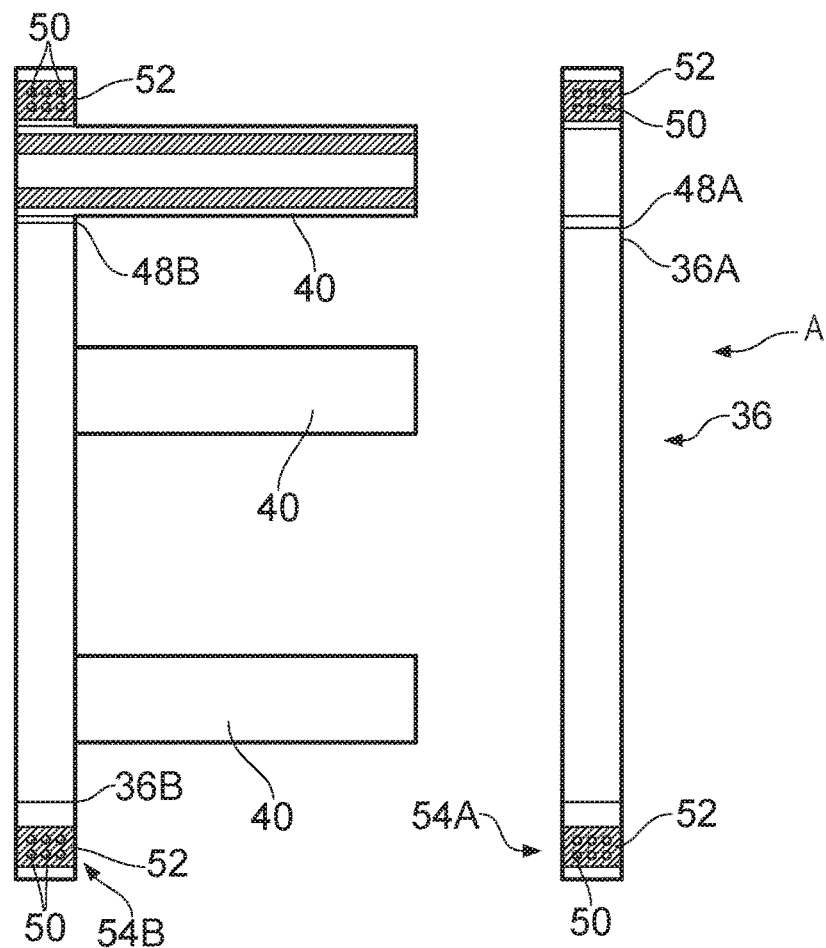
FIG. 4 is a further enlarged cross-sectional view of the gearbox shown in FIG. 3.
Figure 5:
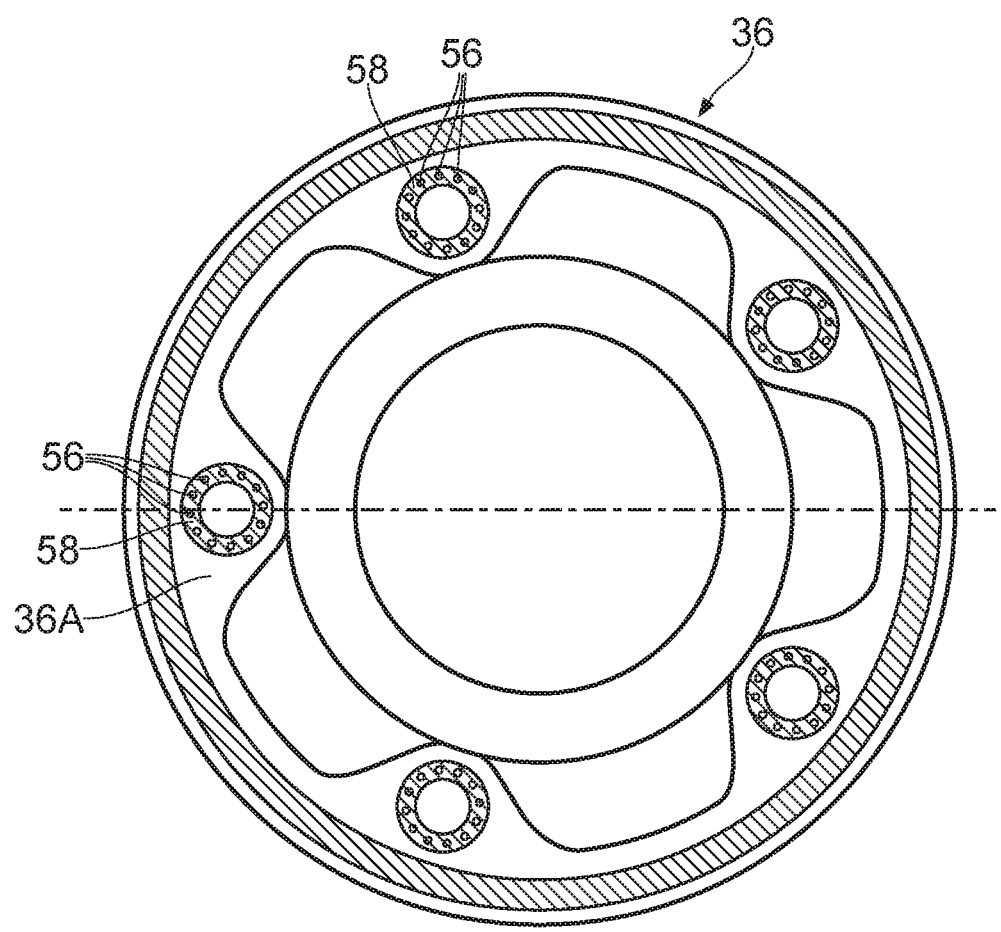
FIG. 5 is a view in the direction of Arrow A of the gearbox shown in FIG. 4.

The gearbox 28 is shown more clearly in FIGS. 3, 4 and 5 and the planet gear carrier 36 comprises a first ring 36A, a second ring 36B spaced axially from the first ring 36A, an extension shaft 36C and a plurality of circumferentially spaced axles 40 which extend axially between the first ring 36A and the second ring 36B. The extension shaft 36C of the planet gear carrier 36 is rotatably mounted in the static structure 24 by a bearing 43. The axles 40 are also arranged parallel to the engine axis 9 and thus the axis of the gearbox 28. The axially spaced ends of each axle 40 are secured to the planet gear carrier 36, e.g. to the first ring 36A and the second ring 36B. The first and second rings 36A and 363 each have a plurality of circumferentially spaced apertures 48A and 48B, each axle 40 locates in a corresponding aperture 48A extending through the first ring 36A and locates in a corresponding aperture 48B extending through the second ring 36B. The first ring 36A and the second ring 36B are secured together. The first ring 36A and the second ring 36B may be fastened, e.g. bolted, together or welded, brazed or bonded together. In this arrangement each planet gear 34 is arranged around a respective one of the axles 40, each planet gear 34 is rotatably mounted in the planet gear carrier 36 and in particular each planet gear 34 is rotatably mounted on a respective one of the axles 40 by a bearing arrangement 42. Each bearing arrangement 42 comprises a journal bearing or a rolling element bearing. In this particular arrangement each bearing arrangement 42 comprises two roller bearings. A lubrication system is arranged to supply lubricant to the planet gear bearing arrangements 42, the sun gear 30 and the planet gears 34. Each of the axles 40 is hollow.

FIGS. 4 and 5 show an arrangement in which the first ring 36A of the carrier 36 comprises a metal matrix composite material ring 54A and the second ring 36B of the carrier 36 comprises a metal matrix composite material ring 54B. The metal matrix composite material ring 54A of the first ring 36A comprises long reinforcing fibres 50 in a metal matrix material 52 and the long reinforcing fibres 50 are wound into a first continuous ring, or loop. The metal matrix composite material ring 54A is arranged between the apertures 48A and the radially outer periphery of the first ring 36A. The metal matrix composite material ring 54B of the second ring 36B also comprises long reinforcing fibres 50 in a metal matrix material 52 and the long reinforcing fibres 50 are wound into a second continuous ring, or loop. The metal matrix composite material ring 54B is arranged between the apertures 48B and the radially outer periphery of the second ring 36B.

The long reinforcing fibres 50 in the metal matrix composite material ring 54A of the first ring 36A are arranged at a radius greater than the radius at which the apertures 48A are arranged. The long reinforcing fibres 50 in the metal matrix composite material ring 54B of the second ring 36B are also arranged at a radius greater than the radius at which the apertures 48B are arranged. Each of the axles 40 comprises a metal matrix composite material and each axle 40 comprises long reinforcing fibres 56 in a metal matrix material 58. The long reinforcing fibres 56 extend axially between the first ring 36A and the second ring 36B. The axes of the axles 48 and hence the axes of the apertures 48A and 488 are arranged at a first radius $R_1$ with respect to the axis of the gearbox 28 and the axis 9 of the turbofan gas turbine engine 10. The first continuous ring 54A and the second continuous ring 54B are arranged at a second radius $R_2$ with respect to the axis of the gearbox 28 and the axis 9 of the turbofan gas turbine engine 10 and the second radius $R_2$ is greater than the first radius $R_1$.

The first metal matrix composite material ring 54A of the first ring 36A may be reinforced with silicon carbide fibres, silicon nitride fibres or boron nitride fibres. The first metal matrix composite material ring 54A of the first ring 36A may comprise an iron matrix, a steel matrix, a titanium matrix, a titanium alloy matrix, an aluminium matrix, an aluminium alloy matrix, a nickel matrix or a nickel alloy matrix. The second metal matrix composite material ring 54B of the second ring 36B may be reinforced with silicon carbide fibres, silicon nitride fibres or boron nitride fibres. The second metal matrix composite material ring 54B of the second ring 36B may comprise an iron matrix, a steel matrix, a titanium matrix, a titanium alloy matrix, an aluminium matrix, an aluminium alloy matrix, a nickel matrix or a nickel alloy matrix. The metal matrix composite material of the axles 40 may be reinforced with silicon carbide fibres, silicon nitride fibres or boron nitride fibres. The metal matrix composite material of the axles 40 may comprise an iron matrix, a steel matrix, a titanium matrix, a titanium alloy matrix, an aluminium matrix, an aluminium alloy matrix, a nickel matrix or a nickel alloy matrix.

Each metal matrix composite material component, the first metal matrix composite material ring 54A, the second metal matrix composite material ring 54B and the axles 40 may be made by making a fibre preform and then depositing a metal matrix material on and around the fibre preform. The metal matrix may be deposited onto the reinforcing fibres using for example vapour deposition, e.g. physical vapour deposition, by thermal spraying or plasma spraying.

In a first example the first metal matrix composite material ring 54A, the second metal matrix composite material ring 54B and the axles 40 comprise a titanium matrix composite with silicon carbide reinforcing fibres. The remainder of the first ring 36A and the remainder of the second ring 36B comprise unreinforced titanium. In a second example the first metal matrix composite material ring 54A, the second metal matrix composite material ring 54B and the axles 40 comprise an iron matrix composite with silicon carbide reinforcing fibres. The remainder of the first ring 36A and the remainder of the second ring 36B comprise unreinforced iron. In a third example the first metal matrix composite material ring 54A, the second metal matrix composite material ring 54B and the axles 40 comprise a steel matrix composite with silicon carbide reinforcing fibres. The remainder of the first ring 36A and the remainder of the second ring 36B comprise unreinforced steel. In each of these examples the silicon carbide fibres may be replaced with silicon nitride fibres or boron nitride fibres.

The first metal matrix composite material ring 54A and the second metal matrix composite material ring 54B with long reinforcing fibres 50 have the reinforcing fibres aligned, or arranged, to carry the loads acting on the planet gear carrier 36 and produce a stiffer structure.

The advantage of the present disclosure is that it enables the planet gear carder to be made as small and lightweight as is practical while providing positioning of the planet gears. The first metal matrix composite material ring and the second metal matrix composite material ring of the planet gear carder are optimised to provide a stiff lightweight reinforcement for the planet gear carder so that it is able to support the loads applied to the planet gears and planet gear bearings, which are generated by torque or centrifugally generated. A planet gear carder comprising a first metal matrix composite material ring and a second metal matrix composite material ring is also able to maintain the positions of the gears very accurately to maintain adequate gear performance in terms of controlling the tooth loading and the noise, or vibration, levels. The weight of the planet gear carder is significantly reduced. Alternatively, a planet gear carder comprising a first metal matrix composite material ring and a second metal matrix composite material ring may be designed to have increased stiffness such that smaller, more efficient teeth may be provided on the sun gear, planet gears and annulus gear.

Figure 6:
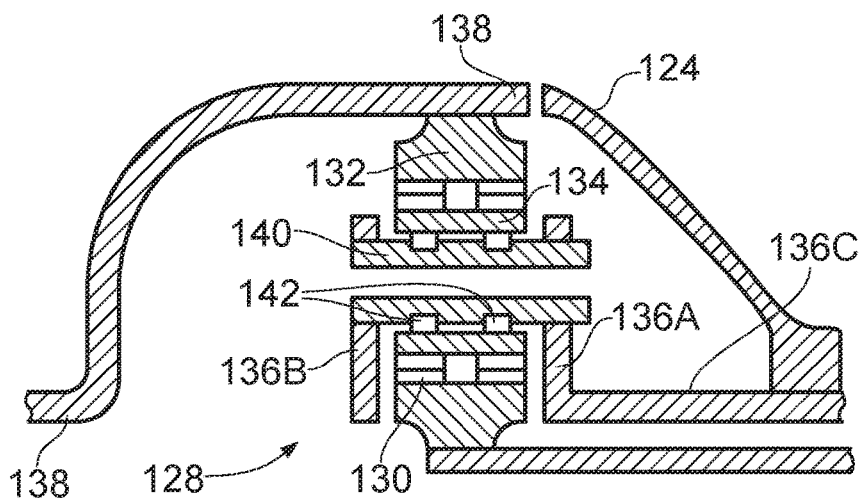
FIG. 6 is an alternative enlarged cross-sectional view though the gearbox shown in FIG. 2.

FIG. 6 shows an arrangement in which the low-pressure turbine 19 drives the fan 13 indirectly via the shaft 126, a gearbox 128 and a shaft 138. The gearbox 128 is a star gearbox and comprises a sun gear 130, an annulus gear 132, a plurality of planet gears 134 and a planet gear carrier 136. The sun gear 130 meshes with the planet gears 134 and the planet gears 134 mesh with the annulus gear 132. The planet gear carrier 136 enabling each planet gear 134 to rotate about its own axis independently. The planet gear carrier 136 is coupled to a static structure 124. The annulus gear 132 is coupled via the shaft 138 to the fan 13 in order to drive its rotation about the engine axis 9. The axes of the planet gears 134 are parallel to the engine axis 9. The planet gear carrier 136 comprises a first ring 136A, a second ring 136B spaced axially from the first ring 136A and a plurality of circumferentially spaced axles 140 which extend axially between the first ring 136A and the second ring 136B. Each planet gear 134 is rotatably mounted on a respective one of the axles 140 and an annular extension 136C extends axially from the first ring 136A. Each planet gear 134 is rotatably mounted in the planet gear carrier 136 by at least one planet gear bearing 142. The annular extension 136O is secured to the static structure 124. In this particular embodiment each planet gear 134 is rotatably mounted on the planet gear carrier 136 by two roller bearings 142. Alternatively each planet gear 134 may be rotatably mounted on the planet gear carrier 136 by a journal bearing. A lubrication system is arranged to supply lubricant to the planet gear bearings 142, the sun gear 130 and the planet gears 134. The gearbox arrangement 128 of FIG. 6 may be provided with a planet gear carrier 136 with a first metal matrix composite material ring 54A, a second metal matrix composite material ring 54B in the first ring 36A and second ring 36B respectively and fibres 50 in the axles 40 as described with reference to FIGS. 3, 4 and 5.

Figure 7:
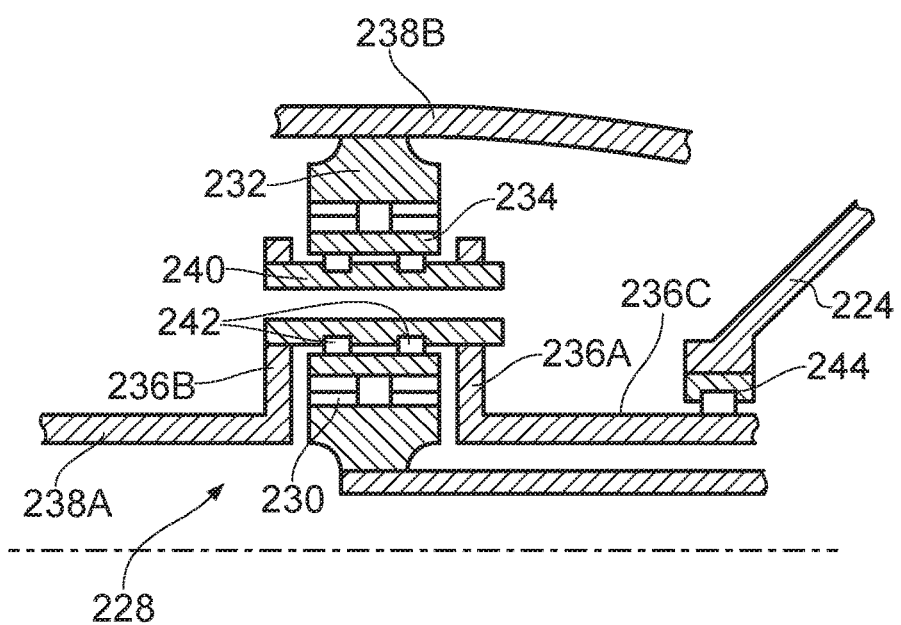
FIG. 7 is a further alternative enlarged cross-sectional view though the gearbox shown in FIG. 2.

FIG. 7 shows an arrangement in which the low-pressure turbine 19 drives two fans indirectly via the shaft 226, a gearbox 228 and shaft 238A and 238B. The gearbox 228 is a differential gearbox and comprises a sun gear 230, an annulus gear 232, a plurality of planet gears 234 and a planet gear carrier 236. The sun gear 230 meshes with the planet gears 234 and the planet gears 234 mesh with the annulus gear 232. The planet gear carrier 236 enabling each planet gear 234 to rotate about its own axis independently. The planet gear carrier 236 is coupled via the shaft 238A to a first propulsor (not shown) and the annulus gear 232 is coupled via the shaft 238B to a second propulsor (not shown) in order to drive their rotation about the engine axis 9. The propulsors are driven to rotate in opposite rotational directions. The axes of the planet gears 234 are parallel to the engine axis 9. The planet gear carrier 236 comprises a first ring 236A, a second ring 236B spaced axially from the first ring 236A and a plurality of circumferentially spaced axles 240 which extend axially between the first ring 236A and the second ring 236B. Each planet gear 234 is rotatably mounted on a respective one of the axles 240 and an annular extension 236C extends axially from the first ring 236A. Each planet gear 234 is rotatably mounted in the planet gear carrier 236 by at least one planet gear bearing 242. The annular extension 236C is rotatably mounted in the static structure 224 by a bearing 244. In this particular embodiment each planet gear 234 is rotatably mounted on the planet gear carrier 236 by two roller bearings 242. Alternatively each planet gear 234 may be rotatably mounted on the planet gear carrier 236 by a journal bearing. A lubrication system 246 is arranged to supply lubricant to the planet gear bearings 242, the sun gear 230 and the planet gears 234. The gearbox arrangement 228 of FIG. 9 may be provided with a planet gear carrier 236 with a first metal matrix composite material ring 54A, a second metal matrix composite material ring 54B in the first ring 36A and second ring 36B respectively and fibres 50 in the axles 40 as described with reference to FIGS. 3, 4 and 5.

In each of the arrangements described above the sun gear, the annulus gear, the carrier and the shaft are coaxial.

In each of the arrangements described above the lubricant, e.g. oil, lubricates and cools the sun, annulus and planet gears and the bearings of the planet gears.

Although the present discourse has referred to a planet gear carrier with reinforcing fibres in the axles of the planet gear carrier it is equally possible to provide a planet gear carrier with unreinforced axles.

Although the present disclosure has referred to a planet gear carrier with a first metal matrix composite material ring and a second metal matrix composite material ring in the first and second rings it may be equally possible to provide only a single metal matrix composite material ring in one of the first and second rings of the planet gear carrier.

Similarly it may be possible to provide more two metal matrix composite material rings in each of the first and second rings of the planet gear carrier. One of the metal matrix composite material rings in each of the first and second rings is provided at a radius greater than the radius at which the axes of the axles are arranged and the other of the metal matrix composite material rings in each of the first and second rings may be arranged at a radius greater than the radius at which the axes of the axles are arranged or at a radius less than the radius at which the axes of the axles are arranged.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the carrier may be arranged to drive a propulsor.

The sun gear may be driven by the low-pressure turbine, the carrier may be secured to static structure and the annulus gear may be arranged to drive a propulsor. In this arrangement each planet gear rotates about its own axis and the carrier does not rotate about the engine axis. The axes of the planet gears are parallel to the engine axis.

The carrier may be driven by the low-pressure turbine, the sun gear may be secured to static structure and the annulus gear may be arranged to drive a propulsor.

The sun gear may be driven by the low-pressure turbine, the carrier may be arranged to drive a first propulsor and the annulus gear may be arranged to drive a second propulsor.

Although the present disclosure has been described with reference to planetary gearbox, star gearbox and differential gearbox arrangements it is equally possible for the gearbox to be arranged in a solar gearbox arrangement, e.g. the sun gear is secured to static structure and either the carrier is driven by an input drive shaft and the annulus gear drives an output drive shaft or the annulus gear is driven by an input drive shaft and the carrier drives an output drive shaft.

The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a gearbox,
the gearbox comprising: a sun gear; an annulus gear; a plurality of planet gears; and a carrier,
the sun gear meshing with the planet gears and the planet gears meshing with the annulus gear;
the carrier comprising a first ring, a second ring spaced axially from the first ring, and a plurality of circumferentially spaced axles extending axially between the first ring and the second ring;
each planet gear being rotatably mounted on a respective one of the plurality of circumferentially spaced axles;
each of the plurality of circumferentially spaced axles being arranged at a first radius;
at least one of the first ring and the second ring comprising a metal matrix composite material;
the metal matrix composite material comprising a ring of reinforcing fibres; and
the ring of reinforcing fibres having a second radius greater than the first radius.

2. A gas turbine engine as claimed in claim 1, wherein
the first ring comprises a first metal matrix composite material and the second ring comprises a second metal matrix composite material;
the first metal matrix composite material comprises a first ring of reinforcing fibres, the first ring of reinforcing fibres having a second radius greater than the first radius; and
the second metal matrix composite material comprises a second ring of reinforcing fibres, the second ring of reinforcing fibres having a second radius greater than the first radius.

3. A gas turbine engine as claimed in claim 2, wherein the first ring and the second ring are secured together.

4. A gas turbine engine as claimed in claim 2, wherein the first metal matrix composite material comprises a metal matrix selected from a group consisting essentially of a steel matrix, a titanium matrix, and a titanium alloy matrix.

5. A gas turbine engine as claimed in claim 2, wherein the first metal matrix composite material comprises reinforcing fibres selected from a group consisting essentially of silicon carbide fibres, silicon nitride fibres, and boron nitride fibres.

6. A gas turbine engine as claimed in claim 2, wherein the second metal matrix composite material comprises a metal matrix selected from a group consisting essentially of a steel matrix, a titanium matrix, and a titanium alloy matrix.

7. A gas turbine engine as claimed in claim 2, wherein the second metal matrix composite material comprises reinforcing fibres selected from a group consisting essentially of silicon carbide fibres, silicon nitride fibres, and boron nitride fibres.

8. A gas turbine engine as claimed in claim 1, wherein each of the plurality of circumferentially spaced axles comprises a third metal matrix composite material, the third metal matrix composite material comprising reinforcing fibres extending axially between the first ring and the second ring.

9. A gas turbine engine as claimed in claim 8, wherein the third metal matrix composite material comprises a metal matrix selected from a group consisting essentially of a steel matrix, a titanium matrix, and a titanium alloy matrix.

10. A gas turbine engine as claimed in claim 8, wherein the third metal matrix composite material comprises silicon carbide fibres, silicon nitride fibres, or boron nitride fibres.

11. A gas turbine engine as claimed in claim 1, wherein each planet gear is rotatably mounted on the carrier by a bearing selected from a group consisting essentially of a journal bearing and at least one rolling element bearing.

12. A gas turbine engine as claimed in claim 11, wherein each planet gear is rotatably mounted on the carrier by two rolling element bearings.

13. A gas turbine engine as claimed in claim 1, wherein the carrier is connected to an output shaft and the annulus gear is connected to a static structure.

14. A gas turbine engine as claimed in claim 1, wherein the carrier is connected to a static structure and the annulus gear is connected to an output shaft.

15. A gas turbine engine as claimed in claim 1, wherein
the gas turbine engine comprises a propulsor, an intermediate-pressure compressor, a high-pressure compressor, a high-pressure turbine, and a low-pressure turbine;
the high-pressure turbine is arranged to directly drive the high-pressure compressor
the low-pressure turbine is arranged to directly drive the intermediate-pressure compressor; and
the low-pressure turbine is arranged to drive the propulsor via the gearbox.

16. A gas turbine engine as claimed in claim 15, wherein the propulsor is selected from a group consisting essentially of a fan and a propeller.

17. A gas turbine engine as claimed in claim 1, wherein
the gas turbine engine comprises a low-pressure turbine, a static structure, and a propulsor;
the sun gear is driven by the low-pressure turbine;
the annulus gear is secured to the static structure; and
the carrier is arranged to drive the propulsor.

18. A gas turbine engine as claimed in claim 1, wherein
the gas turbine engine comprises a low-pressure turbine, a static structure, and a propulsor;
the sun gear is driven by the low-pressure turbine;
the carrier is secured to the static structure; and
the annulus gear is arranged to drive the propulsor.

19. A gearbox comprising:
a sun gear; an annulus gear; a plurality of planet gears; and a carrier,
the sun gear meshing with the planet gears and the planet gears meshing with the annulus gear;
the carrier comprising a first ring, a second ring spaced axially from the first ring, and a plurality of circumferentially spaced axles extending axially between the first ring and the second ring;
each planet gear being rotatably mounted on a respective one of the plurality of circumferentially spaced axles, each of the plurality of circumferentially spaced axles being arranged at a first radius; and
at least one of the first ring and the second ring comprising a metal matrix composite material, the metal matrix composite material comprising a ring of reinforcing fibres, and the ring of reinforcing fibres having a second radius greater than the first radius.

20. A planet gear carrier comprising:
a first ring;
a second ring spaced axially from the first ring;
a plurality of circumferentially spaced axles extending axially between the first ring and the second ring; and
a plurality of planet gears,
each planet gear being rotatably mounted on a respective one of the plurality of circumferentially spaced axles, each of the plurality of circumferentially spaced axles being arranged at a first radius; and
at least one of the first ring and the second ring comprising a metal matrix composite material, the metal matrix composite material comprising a ring of reinforcing fibres, and the ring of reinforcing fibres having a second radius greater than the first radius.

* * * * *